United States Patent [19]

Tomita et al.

[11] Patent Number: 5,017,651
[45] Date of Patent: May 21, 1991

[54] THERMOPLASTIC RESIN COMPOSITION

[75] Inventors: Haruo Tomita; Kouichi Yamashita; Takeshi Kondo; Noriyuki Suzuki; Shigemi Matsumoto; Masahiro Asada, all of Hyogo, Japan

[73] Assignee: Kanegafuchi Kagaku Kogyo Kabushiki Kaisha, Osaka, Japan

[21] Appl. No.: 450,970

[22] Filed: Dec. 15, 1989

[30] Foreign Application Priority Data

Dec. 21, 1988 [JP] Japan ............................ 63-323936
Dec. 21, 1988 [JP] Japan ............................ 63-323937
Feb. 28, 1989 [JP] Japan ............................ 1-49546
May 31, 1989 [JP] Japan ............................ 1-137974

[51] Int. Cl.$^5$ .................... C08L 67/03; C08L 77/02; C08L 77/06
[52] U.S. Cl. .................... 525/66; 525/133; 525/425

[58] Field of Search ................ 525/66, 133, 425

[56] References Cited

U.S. PATENT DOCUMENTS 4,187,358  2/1980  Kyo ..................................... 525/132
4,804,707  2/1989  Okamoto et al. ..................... 525/66

FOREIGN PATENT DOCUMENTS 0291997  11/1988  European Pat. Off. .

*Primary Examiner*—Patricia Short
*Attorney, Agent, or Firm*—Armstrong, Nikaido, Marmelstein, Kubovcik & Murray

[57] ABSTRACT

Thermoplastic resin compositions having excellent heat distortion resistance, impact resistance, chemical resistance and molding properties. The compositions are mixtures of a polyarylate, a polyamide and a specified graft copolymer or modified polyolefin.

23 Claims, No Drawings

THERMOPLASTIC RESIN COMPOSITION

FIELD OF THE INVENTION

This invention relates to a thermoplastic resin composition which has excellent heat distortion resistance, impact resistance and chemical resistance, and is also excellent in dispersibility, mechanical properties and molding properties. More particularly, the present invention relates to a thermoplastic resin composition obtained by incorporating a specific polymer into a composition comprising an aromatic polyester (hereinafter referred to as polyarylate) and a polyamide.

BACKGROUND OF THE INVENTION

So-called polymer alloys are known as plastic molding materials and are prepared by blending two or more kinds of resin materials by kneading or by other means so as to allow each resin material to compensate for disadvantages of the other resin materials.

Known as one of such polymer alloys is a resin composition comprising 100 parts by weight of a polyarylate and 100 parts by weight or less of a polyamide, and which is excellent in all of heat distortion resistance, molding properties and chemical resistance (refer to JP-B-56-14699 and JP-A-52-98765). (The terms "JP-B" and "JP-A" as used herein mean an "examined Japanese patent publication" and an "unexamined published Japanese patent application", respectively.)

According to the above prior art references, not only the molding properties but also the chemical and oil resistances of a polyarylate are improved by blending it with a polyamide. On the other hand, it is expected that a resin composition having well-balanced properties can be obtained by dispersing a polyarylate into a polyamide to take advantage of the good molding properties and chemical resistance of the polyamide and to impart to the composition the good heat distortion resistance of the polyarylate. However, it is generally difficult to uniformly and finely disperse a polyarylate into a polyamide. In the case where the dispersion of the polyarylate is not uniform and the dispersed polyarylate particles are coarse, well-balanced properties cannot be obtained and the resin composition has problems such as, for example, poor molding properties, poor chemical resistance and low strengths. Although it is essential to uniformly and finely disperse a polyarylate into a polyamide for making the composition exhibit excellent properties, there has not yet been found a method effective in attaining the desired dispersion.

On the other hand, although the polyarylatepolyamide composition has both excellent heat distortion resistance attributable to the polyarylate and excellent molding properties and chemical resistance attributable to the polyamide, such properties alone are insufficient in some applications. Since the above resin composition has a disadvantage of being poor in impact resistance, specifically in both Izod impact strength and high-speed punching impact strength, the resin composition has limited application.

As compositions free from the above drawback, there have recently been proposed resin compositions prepared by incorporating various modified polyolefins as an impact resistance improver into the above-described resin composition (see JP-B-62-944, JP-A-61-183353 and JP-A-62-277462).

These resin compositions containing the above-mentioned impact resistance improvers are to some extent improved in that molded articles obtained therefrom have high Izod impact strengths as compared with molded articles obtained from resin compositions not containing the above-mentioned impact resistance improvers. However, the above-proposed resin compositions are still insufficient in high-speed punching impact strength, which is important from a practical standpoint. The high-speed punching impact strengths of these resin compositions are very low particularly at low temperatures of around $-30°$ C. and, hence, problems will be caused if such resin compositions are used for the production of exterior automobile trim parts which are required to have such low-temperature high-speed impact resistance.

Further, the use of modified polyolefins as an impact resistance improver has the problems that there are cases where molded articles develop surface defects such as silver streaks and flow marks and that the modified polyolefins impair the weld strength of molded articles.

The present inventors have conducted intensive studies to overcome the problems described above. As a result, they have succeeded in developing a thermoplastic resin composition having good impact resistance while retaining the excellent physical properties.

SUMMARY OF THE INVENTION

It is, therefore, an object of the present invention to provide a molding material which not only shows excellent heat distortion resistance, impact resistance and chemical resistance, but also has excellent molding properties.

It is another object of the present invention to provide a thermoplastic resin composition from which there can be obtained molded articles good in both high-speed punching impact strength, particularly low-temperature high-speed punching impact strength, and impact strength at welded parts thereof, and also excellent in surface quality.

According to the present invention, there are provided, a thermoplastic resin composition which comprises 100 parts by weight of a resin composition (A-1) consisting of 20 to 80% by weight of a polyarylate and 80 to 20% by weight of a polyamide; and 1 to 40 parts by weight of a graft copolymer (B), in which 70 to 5% by weight of at least one monomer selected from the group consisting of vinyl compounds, unsaturated glycidyl compounds, $\alpha,\beta$-unsaturated dicarboxylic anhydrides, and $\alpha,\beta$-unsaturated carboxylic acids is copolymerized in the presence of 30 to 95% by weight of rubber-like elastomer; a thermoplastic resin composition which comprises 100 parts by weight of a resin composition (A-2) consisting of 20 to 80% by weight of a polyarylate having an acid value of $30 \times 10^{-6}$ to $150 \times 10^{-6}$ eq./gram (eq/g) and 80 to 20% by weight of a polyamide; and 1 to 40 parts by weight of a graft copolymer (B) or a modified polyolefin (C), said graft copolymer (B) being obtained by copolymerizing 70 to 5% by weight of at least one monomer selected from the group consisting of vinyl compounds, unsaturated glycidyl compounds, $\alpha,\beta$-unsaturated dicarboxylic anhydrides, and $\alpha,\beta$-unsaturated carboxylic acids in the presence of 30 to 95% by weight of rubber-like elastomer; and a thermoplastic resin composition which comprises 20 to 80% by weight of a polyarylate having an acid value of $30 \times 10^{-6}$ to $150 \times 10^{-6}$ eq/g and 80 to 20% by weight of a polyamide.

DETAILED DESCRIPTION OF THE INVENTION

The resin composition (A) employed in the thermoplastic resin composition of this invention consists of a polyarylate and a polyamide.

The polyarylate employed in this invention is not particularly limited in structure as long as it is an aromatic polyester synthesized generally from a bisphenol or derivative thereof and an aromatic dibasic acid or derivative thereof. Preferably, however, the polyarylate is one obtained by use of terephthalic acid and/or isophthalic acid or derivatives thereof. Such derivatives of terephthalic or isophthalic acid include dichlorides, alkyl or aryl diesters, and the like.

The bisphenol is preferably one represented by the following general formula

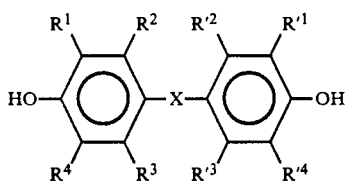

wherein —X— is selected from the group consisting of —O—, —S—, —SO$_2$—,

an alkylene group, and an alkylidene group, and $R^1$, $R^2$, $R^3$, $R^4$, $R'^1$, $R'^2$, $R'^3$ and $R'^4$ are independently selected from the group consisting of a hydrogen atom, a halogen atom, an alkyl group having 1 to 20 carbon atoms, and an aryl group having 6 to 20 carbon atoms. Examples of the bisphenol include 2,2-bis(4-hydroxyphenyl)-propane, bis(4-hydroxyphenyl)-methane, bis(4-hydroxy-3,5-dimethylphenyl)methane, bis(4-hydroxy-3,5-dichlorophenyl)methane, 1,1-bis(4-hydroxyphenyl)ethane, bis(4-hydroxyphenyl-cyclohexyl)methane, bis(4-hydroxyphenyl)phenylmethane, 4,4-dihydroxydiphenyl ether, bis(4-hydroxy-3,5-dimethylphenyl)ether, bis (4-hydroxyphenyl)sulfone, bis(4-hydroxy-3,5-dimethylphenyl)sulfone, and 4,4'-dihydroxybenzophenone. According to need, a small proportion of another divalent compound such as, for example, 4,4-biphenol, hydroquinone, resorcinol, or 2,6-dihydroxynaphthalene can be used in addition to the above-described bisphenol.

The polyarylate to be used in this invention can be produced by an interfacial polymerization method, solution polymerization method, melt polymerization method, or other polymerization method. The polyarylate preferably has a solution viscosity in the range of from 0.2 to 1.5 in terms of intrinsic viscosity (chloroform solution, 30° C.). Polyarylates having solution viscosities outside the above range are undesirable from the standpoints of impact resistance, heat distortion resistance, and molding properties.

The polyamide employed in this invention can be one represented by the general formula

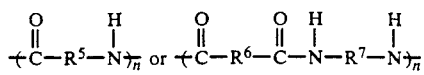

wherein $R^5$, $R^6$ and $R^7$ independently represent a phenylene group or an alkylene group. Examples of the polyamide employed in this invention include those produced by condensation reaction of a diamine with a dibasic acid, self-condensation of an amino acid, and polymerization of a lactam.

Specific examples of the polyamide employed in this invention include polytetramethylene adipamide, polyhexamethylene adipamide, polycaprolactam, and polyhexamethylene sebacamide. The polyamide can be a copolymer of two or more monomers, or a combination of two or more polymers. The polyamide preferably has a solution viscosity in the range of from 2.0 to 5.0 in terms of intrinsic viscosity (1% solution in concentrated sulfuric acid, 25° C.). Polyamides having solution viscosities outside the above range are undesirable because such polyamides are poor in impact resistance, chemical resistance, molding properties, and other properties.

When the polyarylate employed in this invention has a terminal carboxylic acid group content of $30 \times 10^{-6}$ eq/g or more, the objects of the present invention can be particularly achieved in high level. There is no particular upper limit to the terminal carboxylic acid group content in the polyarylate, but the upper limit inevitably upon the molecular weight of the polyarylate. The terminal carboxylic acid group content (hereinafter often referred to as "acid value") is preferably in the range of from $30 \times 10^{-6}$ to $150 \times 10^{-6}$ eq/g. If the acid value of the polyarylate is below $30 \times 10^{-6}$ eq/g, the effects of the present invention cannot sufficiently be produced, while acid values higher than $150 \times 10^{-6}$ eq/g are undesirable because the heat stability of the composition is impaired. Most preferably, the acid value is in the range of from $40 \times 10^{-6}$ to $100 \times 10^{-6}$ eq/g.

The above-described acid value of the polyarylate can be determined by neutralization titration of a solution of the polymer by means of an alkali.

The polyarylate which satisfies the above-described acid value requirement preferably has a solution viscosity in the range of from 0.2 to 1.5 in terms of intrinsic viscosity (chloroform solution, 30° C.). If the solution viscosity of the polyarylate is outside the above range, the high-speed punching impact strength and molding properties of the resulting composition are impaired. The more preferred range of the intrinsic viscosity is from 0.4 to 0.8.

Methods of producing the above-described polyarylate having a terminal carboxylic acid group content within the above-specified range are not particularly limited. For example, the polyarylate can be obtained by subjecting a bisphenol and tere- or isophthalic acid dichloride to interfacial polycondensation while regulating the molar ratio of the bisphenol to the dichloride and the reaction temperature.

The acid value of the polyarylate may be regulated, for example, as follows. In the case where an interfacial polycondensation method is used, the times at which the acid ingredient and the bisphenol ingredient are introduced into the reaction system are controlled, so as to incorporate carboxylic acid groups into the polyarylate at the ends of its main chain in a proper proportion.

The acid value of the polyarylate may alternatively be regulated by a method in which a proper amount of an aromatic dicarboxylic acid is added to a polyarylate having an acid value below $30 \times 10^{-6}$ eq/g, followed by melt-mixing to perform an ester interchange reaction.

Alternatively, a polyarylate having a terminal carboxylic acid group content within the range as specified above can be obtained by subjecting tere- or isophthalic acid and a bisphenol diacetate to melt polycondensation.

The polyamide employed in this invention can be one prepared mainly from an aliphatic amino acid, lactam, or diamine and an aliphatic dicarboxylic acid. Representative examples of such main monomers include amino acids such as 6-aminocaproic acid, 11-amninoundecanoic acid, and 12-aminododecanoic acid; lactams such as $\epsilon$-caprolactam and $\omega$-laurolactam; diamines such as tetramethylenediamine, hexamethylenediamine, undecamethylenediamine, and dodecamethylenediamine; and dicarboxylic acids such as adipic acid, azelaic acid, sebacic acid, dodecanedioic acid, and diglycolic acid. The polyamide can be a copolymer polyamide comprising a small proportion of aromatic monomer units or alicyclic monomer units in addition to the above-described aliphatic monomer units, or can be a combination of polyamides.

Exemplary polyamides particularly useful in this invention are polycapramide (nylon-6), polyhexamethylene adipamide (nylon-66), polytetramethylene adipamide (nylon-46), and polydodecanamide (nylon-12). Of these, nylon-6 and nylon-66 are particularly important.

The polyamide resin preferably has a relative viscosity, as measured at 25° C on a 1% solution thereof in concentrated sulfuric acid, in the range of from 2.0 to 5.0.

The proportion of the polyarylate to the polyamide according to the present invention is such that the polyarylate is substantially dispersed in the polyamide and that good heat distortion resistance, etc. characteristics of the polyarylate can be imparted to the resulting thermoplastic resin composition. Specifically, the polyarylate content in the resin composition (A) is in the range of from 20 to 80% by weight and the polyamide content is in the range of from 80 to 20% by weight. Preferably, the polyarylate content is from 30 to 70% by weight and the polyamide content is from 70 to 30% by weight.

The mixing of the polyarylate with the polyamide can be preferably be performed while both ingredients are maintained in their molten state. For example, there can be employed heat rolls, an extruder, a Banbury mixer, or a Brabender. According to need, additives generally added to plastics can be incorporated into the composition according to this invention. Such additives include rubber ingredients for imparting impact resistance to the composition, stabilizers, lubricants, inorganic fillers, and reinforcing fibers.

The graft copolymer obtained by graft-polymerizing a specific monomer with a rubber-like elastomer is explained below. The rubber-like elastomer to be used in such graft polymerization preferably has a glass transition temperature (Tg) of 0° C. or lower, more preferably $-40°$ C. or lower. Specific examples of the rubber-like elastomer include diene-based rubbers such as polybutadiene, butadiene-styrene copolymers, styrene-butadiene-styrene triblock copolymers, and butadiene-butyl acrylate copolymers; acrylic rubbers such as poly(butyl acrylate) and poly(2-ethylhexyl acrylate); and olefin-based rubbers such as ethylene-propylene copolymers and ethylene-propylene-diene copolymers. The gel content in the rubber-like elastomer is not particularly limited, but is preferably 10% by weight or more. Further, the form of the rubber-like elastomer to be subjected to graft polymerization is not particularly limited and the elastomer can be in the form of a powder, pellets, crumbs, a latex, or the like. However, in the case of a latex, the rubber-like elastomer particles in the latex preferably have an average particle diameter of from 0.05 to 2.0 microns.

The monomer which is to be subjected to graft copolymerization with the rubber-like elastomer is at least one member selected from the group consisting of vinyl compounds, unsaturated glycidyl compounds, $\alpha,\beta$-unsaturated dicarboxylic anhydrides, and $\alpha,\beta$-unsaturated carboxylic acids.

Examples of the vinyl compounds include aromatic vinyl compounds such as styrene, methylstyrene, and $\alpha$-methylstyrene; cyanides of vinyl compounds such as acrylonitrile and methacrylonitrile; and (meth)acrylates such as methyl (meth)acrylate, ethyl (meth)acrylate, butyl (meth)acrylate, and 2-ethylhexyl (meth)acrylate.

Examples of the $\alpha,\beta$-unsaturated dicarboxylic anhydrides include maleic anhydride, methylmaleic anhydride, chloromaleic anhydride, and citraconic anhydride.

Examples of the $\alpha,\beta$-unsaturated carboxylic acids include acrylic acid and methacrylic acid.

Examples of the unsaturated glycidyl compounds include glycidyl acrylate, glycidyl methacrylate, glycidyl itaconate, glycidyl styrenecarboxylate, and 3,4-epoxy-1-butene.

The specific monomer employed in this invention is not particularly limited when the monomer is used in the relative proportions of the monomer compounds as described above. However, the monomer preferably consists of 50 to 100% by weight of a vinyl compound, 0 to 50% by weight of an $\alpha,\beta$-unsaturated dicarboxylic anhydride, 0 to 50% by weight of an $\alpha,\beta$-unsaturated carboxylic acid, and 0 to 50% by weight of an unsaturated glycidyl compound. Further, the vinyl compound employed in the monomer is also not particularly limited, but the vinyl compound preferably consists of 20 to 90% by weight of an aromatic vinyl compound, 0 to 40% by weight of a vinyl compound cyanide, and 0 to 80% by weight of a (meth)acrylic ester compound.

In the graft copolymer, the proportion of the rubber-like elastomer to the specific monomer is such that the graft copolymer consists of 30 to 95% by weight of the rubber-like elastomer and 70 to 5% by weight of the specific monomer. If the proportion of the rubber-like elastomer is outside the above range, the resulting thermoplastic resin composition undesirably has poor impact resistance, stiffness, etc., and molded articles obtained from the composition develop surface defects. Methods of graft-polymerizing the specific monomer in the presence of the rubber-like elastomer to produce a graft copolymer are not particularly limited, and there may be employed solution polymerization, suspension polymerization, bulk polymerization, emulsion polymerization, or other methods.

For the purpose of obtaining a thermoplastic resin composition having improved impact resistance, incorporation of a modified polyolefin as the polymer (B) is effective.

As the above-mentioned modified polyolefin, there may be mentioned a polymer which has been prepared mainly from an $\alpha$-olefin having 2 to 30 carbon atoms, 1-butene, 4-methyl-1-pentene, isobutylene, or a diene compound such as 1,4-hexadiene, dicyclopentadiene, 2,5-norbornadiene, 5-ethylidenenorbornene, butadiene, or isoprene, and which has been modified by introducing therein a monomer having at least one functional group selected from the group consisting of a carboxylic acid group, a carboxylic acid metal salt group, a carboxylate group, an acid anhydride group, an epoxy group, an acid amide group, and an imide group.

Examples of the above monomer having at least one functional group include acrylic acid, methacrylic acid, maleic acid, fumaric acid, itaconic acid, monomethyl maleate, methyl acrylate, ethyl acrylate, 2-ethylhexyl acrylate, methyl methacrylate, 2-ethylhexyl methacrylate, aminoethyl methacrylate, dimethyl maleate, sodium acrylate, sodium methacrylate, potassium acrylate, potassium methacrylate, magnesium acrylate, magnesium methacrylate, zinc methacrylate, maleic anhydride, itaconic anhydride, glycidyl acrylate, glycidyl methacrylate, allyl glycidyl ether, acrylamide, methacrylamide, maleimide, and phenylmaleimide.

The above-described monomer having a functional group can be incorporated into a polyolefin by copolymerizing the monomer with an $\alpha$-olefin or other monomer useful for preparing the polyolefin or with a polyolefin-type polymer.

Preferably, the modified polyolefin described above is an acid anhydride-containing polyolefin or an epoxy group-containing polyolefin, or a mixture thereof with the proportion of the former polyolefin to the latter polyolefin being from 1/9 to 9/1 by weight.

As the acid anhydride-containing polyolefin mentioned above, there may be mentioned, for example, a polymer obtained by copolymerizing or graft-polymerizing an alicyclic dicarboxylic anhydride having a cis-form double bond in the ring thereof or an $\alpha,\beta$-unsaturated dicarboxylic anhydride with an olefin homopolymer such as polyethylene, polypropylene, or polybutene-1 or with an olefin copolymer such as an ethylene-propylene copolymer, an ethylene-butene-1 copolymer, an ethylene-propylene-diene copolymer (EPDM), or an ethylene-vinyl acetate copolymer.

Examples of the above-mentioned alicyclic dicarboxylic anhydride having a cis-form double bond in the ring thereof include cis-4-cyclohexene-1,2-dicarboxylic anhydride and endobicyclo-(2,2,1)-5-heptene-2,3-dicarboxylic anhydride.

Examples of the above-mentioned $\alpha,\beta$-unsaturated dicarboxylic anhydride include maleic anhydride, methylmaleic anhydride, chloromaleic anhydride, and citraconic anhydride.

In preparing the acid anhydride-containing olefin copolymer, a methacrylate such as methyl or ethyl methacrylate, an acrylate such as ethyl or butyl acrylate, or the like may be employed as a comonomer according to need.

In the acid anhydride-containing olefin copolymer, the content of acid anhydride monomer units incorporated by copolymerization or graft polymerization and the content of acid anhydride monomer units incorporated through copolymerization or graft polymerization in the acid anhydride-containing olefin copolymer is preferably in the range of from 0.01 to 10% by weight. If the content thereof is outside this range, the resulting composition undesirably has poor impact resistance and the surface quality of molded articles obtained from the composition is also impaired. The more preferred range of the acid anhydride monomer unit content is from 0.1 to 5% by weight.

The acid anhydride-containing olefin copolymer which may be employed in this invention as the polymer is an olefin homopolymer such as polyethylene, polypropylene, or polybutene-1, or an olefin copolymer such as an ethylene-propylene copolymer, an ethylene-butene-1 copolymer, an ethylene-propylene-diene copolymer, an ethylene-vinyl acetate copolymer, or an ethylene-acrylic ester copolymer, and which has been modified to contain, as copolymerized monomer units, an alicyclic carboxylic anhydride having a cis-form double bond in the ring thereof or an $\alpha,\beta$-unsaturated dicarboxylic anhydride. Examples of the alicyclic carboxylic anhydride having a cis-form double bond in the ring thereof include cis-4-cyclohexene-1,2-dicarboxylic anhydride and endobicyclo-(2,2,1)-5-heptene-2,3-dicarboxylic anhydride. Examples of the $\alpha,\beta$-unsaturated dicarboxylic anhydride include maleic anhydride, methylmaleic anhydride, chloromaleic anhydride, and citraconic anhydride.

In preparing the acid anhydride-containing olefin copolymer as described above, other copolymerizable monomers can be copolymerized, according to need, with the essential monomers described above. Examples of such copolymerizable monomers include methacrylates such as methyl methacrylate and ethyl methacrylate; acrylates such as ethyl acrylate, butyl acrylate, and 2-ethylhexyl acrylate; aromatic vinyl compounds such as styrene and o-methylstyrene; and cyanides of vinyl compounds such as acrylonitrile and methacrylonitrile.

The content of the copolymerized carboxylic anhydride in the above-described acid anhydride-containing olefin copolymer is from 0.01 to 30% by weight, preferably from 0.05 to 20% by weight. If the content thereof is outside the above range, the resulting composition undesirably has poor impact resistance and stiffness or poor molding properties. The acid anhydride-containing olefin copolymer is not limited with respect to the arrangement of the monomer units, and can be a random copolymer, block copolymer, or graft copolymer.

Particularly preferred as the acid, anhydride-containing olefin copolymer are copolymers obtained by graft-polymerizing maleic anhydride with an ethylene-propylene copolymer. Of these, a more preferred acid anhydride-containing olefin copolymer is one in which the weight-average molecular weight (Mw) of the ethylene-propylene copolymer is from 150,000 to 1,000,000 and the content of the graft-polymerized maleic anhydride is from 0.3 to 5% by weight.

The epoxy group-containing olefin copolymer mentioned hereinabove can be one obtained by copolymerizing or graft-polymerizing an epoxy compound having an unsaturated group with an olefin homopolymer such as polyethylene, polypropylene, or polybutene-1 or with an olefin copolymer such as an ethylene-propylene copolymer, an ethylene-butene-1 copolymer, an ethylene-propylene-diene copolymer, or an ethylene-vinyl acetate copolymer.

Examples of the above-mentioned epoxy compound having an unsaturated group include glycidyl acrylate, glycidyl methacrylate, monoglycidyl itaconate, p-glycidylstyrene, p-glycidylhydroxystyrene, and allyl glycidyl ether.

According to need, in preparing the epoxy group-containing olefin copolymer as described above, a methacrylate such as methyl or ethyl methacrylate, an acrylate such as ethyl or butyl acrylate, or similar monomer can be employed as a co-monomer.

The content of unsaturated group-containing epoxy compound monomer units incorporated through copolymerization or graft polymerization in the olefin copolymer is preferably in the range of from 0.01 to 10% by weight. If the content thereof is outside this range, the resulting composition undesirably has poor impact resistance and the surface quality of molded articles obtained from the composition is also impaired. The more preferred range of the epoxy compound monomer unit content is from 0.1 to 5% by weight.

The polymerization degree of the above-described modified polyolefin is not particularly limited in this invention, but in general, the modified polyolefin has a melt index of about 0.05 to 50 g/10 min. The preferred polymerization degree thereof is such that the melt index thereof is from about 0.1 to 30 g/10 min.

The amount of the polymer (B) incorporated in the resin composition (A) is from 1 to 40 parts by weight, preferably from 5 to 30 parts by weight, per 100 parts by weight of the resin composition (A). If the proportion of the polyarylate to the polyamide in the resin composition (A) and the amount of the polymer (B) incorporated in the resin composition (A) are outside the respective ranges specified above, the resulting thermoplastic resin composition is poor in heat distortion resistance, impact resistance, molding properties, chemical resistance, etc., and molded articles obtained from the composition are also poor in surface quality, etc.

According to need, the thermoplastic resin composition of this invention may be modified so as to have other functions by incorporating therein a lubricant such as wax, a phosphorus-containing or phenolic-type stabilizer, an ultraviolet absorber, a pigment, a flame retarder, a plasticizer, an inorganic filler, reinforcing fibers, or other additives.

Methods of producing the thermoplastic resin composition of the present invention are nor particularly limited, but the melt-mixing method is most preferably employed. For melt mixing, various known blenders may be used such as, for example, an extruder, heat rolls, a Brabender, and a Banbury mixer.

The present invention will be explained in more detail by reference to the following Examples, which should not be construed as limiting the scope of the invention. In the Examples and Comparative Examples, all parts and percentages are by weight unless otherwise indicated.

EXAMPLES 1-11 AND COMPARATIVE EXAMPLES 1-7

Resin Composition (A)

Polyarylate: A polymer produced from 2,2-bis(4-hydroxyphenyl)propane and a 3/7 mixture of terephthalic acid and isophthalic acid, and having an intrinsic viscosity of 0.6.

Polyamide: Polycaprolactam (trade name AMILAN CM 1026, manufactured by Toray Industries, Inc., Japan). Graft Copolymer [Polymer (B)]

B-1 to B-7 as specified below were used;

B-1: A polymer obtained by graft-copolymerizing, by means of emulsion polymerization, a mixture composed of 15 parts of styrene and 15 parts of methyl methacrylate with 70 parts (on a dry basis) of a latex of polybutadiene having an average particle diameter of 0.25 micron and a gel content of 83%, then subjecting the resulting emulsion to salting out with calcium chloride, followed by washing with water, dehydrating and then drying.

B-2: A polymer obtained by graft-copolymerizing, by means of emulsion polymerization, a mixture composed of 4 parts of glycidyl methacrylate, 8 parts of acrylonitrile and 18 parts of styrene with 70 parts (on a dry bases) of the same polybutadiene latex as that used for preparing B-1, then subjecting the resulting emulsion to salting out with magnesium chloride, followed by washing with water, dehydrating and then drying.

B-3: A polymer obtained by graft-copolymerizing, by means of emulsion polymerization, a mixture composed of 2 parts of maleic anhydride, 14 parts of styrene, 3 parts of acrylonitrile and 16 parts of methyl methacrylate with 65 parts (on a dry basis) of a latex of poly(butyl acrylate) having an average particle diameter of 0.29 micron and a gel content of 86%, then subjecting the resulting emulsion to salting out with calcium chloride, followed by washing with water, dehydrating and then drying.

B-4: A polymer obtained by graft-copolymerizing, by means of emulsion polymerization, a mixture composed of 4 parts of methacrylic acid, 21 parts of styrene, 5 parts of acrylonitrile and 10 parts of butyl acrylate with 60 parts (on a dry basis) of a latex of an ethylene-propylene-diene copolymer having an average particle diameter of 0.36 micron and a gel content of 50%, then subjecting the resulting emulsion to salting out with calcium chloride, followed by washing with water, dehydrating and then drying.

B-5: A polymer obtained by use of same polybutadiene as that used for preparing B-1 and in the same manner as that for B-1 except that 1 part of methyl methacrylate was graft-copolymerized with 99 parts of the polybutadiene.

B-6: A polymer obtained by use of the same polybutadiene as that used for preparing B-1 and in the same manner as that for B-1 except that a mixture composed of 85 parts of styrene and 5 parts of acrylonitrile was graft-copolymerized with 10 parts of the polybutadiene.

B-7: An ethylene-propylene copolymer (EPR) having an average molecular weight of 100,000 and an ethylene content of 73%.

Using the above-described polyarylate, polyamide [both for forming Resin Composition (A)], graft copolymers [Polymer (B)], and EPR, various thermoplastic resin compositions were prepared by mixing the ingredients in the respective amounts as shown in Table 1, and then subjecting each of the resulting mixtures to vacuum drying at 80° C. for 10 hours. Each of the dried compositions was pelletized at 270° C. with a double-screw extruder. The thus-obtained pellets were formed into test pieces by injection molding, and the test pieces were evaluated for various properties. The results obtained are shown in Table 1.

Table 1 shows that the thermoplastic resin compositions of this invention are excellent not only in impact resistance, heat distortion resistance, and stiffness, but also in molding properties.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |

TABLE 1-continued

| Resin Composition (A) | | | | | | | | | | | |
|---|---|---|---|---|---|---|---|---|---|---|---|
| Polyarylate (parts) | 50 | 50 | 50 | 50 | 50 | 60 | 40 | 70 | 30 | 50 | 50 |
| Polyamide (parts) | 50 | 50 | 50 | 50 | 50 | 40 | 60 | 30 | 70 | 50 | 50 |
| Graft Copolymer [Polymer (B)] | | | | | | | | | | | |
| B-1 (parts) | 20 | | | | 10 | | | | | | 5 |
| B-2 (parts) | | 20 | | | | 20 | | 10 | | 10 | 5 |
| B-3 (parts) | | | 20 | | | | | | 30 | 10 | 5 |
| B-4 (parts) | | | | 20 | | | 20 | | | | 5 |
| B-5 (parts) | | | | | | | | | | | |
| B-6 (parts) | | | | | | | | | | | |
| B-7 (parts) | | | | | | | | | | | |
| Izod impact strength | 63 | 68 | 65 | 69 | 49 | 61 | 73 | 43 | 95 | 68 | 65 |
| Falling ball strength | 6.0 | 6.5 | 4.1 | 6.8 | 4.8 | 5.9 | 7.0 | 4.2 | 7.1 | 6.7 | 5.7 |
| Tensile strength | 575 | 610 | 613 | 611 | 621 | 601 | 589 | 635 | 551 | 609 | 590 |
| Heat distortion temperature | 174 | 175 | 175 | 175 | 178 | 176 | 170 | 186 | 165 | 176 | 175 |
| Molding property | Δ | O | O | O | Δ | O | O | O | O | O | O |

| | Comparative Example | | | | | | |
|---|---|---|---|---|---|---|---|
| | 1 | 2 | 3 | 4 | 5 | 6 | 7 |
| Resin Composition (A) | | | | | | | |
| Polyarlate (parts) | 50 | 50 | 50 | 50 | 95 | 90 | 10 |
| Polyamide (parts) | 50 | 50 | 50 | 50 | 5 | 10 | 90 |
| Graft Copolymer [Polymer (B)] | | | | | | | |
| B-1 (parts) | | | | | 10 | 60 | |
| B-2 (parts) | | | | | | | |
| B-3 (parts) | | | | | | | |
| B-4 (parts) | | | | | | | |
| B-5 (parts) | | 20 | | | | | 40 |
| B-6 (parts) | | | 20 | | | | |
| B-7 (parts) | | | | 20 | | | |
| Izod impact strength | 6 | 7 | 9 | 10 | 25 | 63 | 11 |
| Falling ball strength | 0.7 | 0.9 | 1.0 | 1.1 | 2.1 | 6.8 | 1.3 |
| Tensile strength | 643 | 431 | 445 | 435 | 641 | 325 | 381 |
| Heat distortion | 180 | 161 | 160 | 160 | 191 | 142 | 135 |
| Molding property | X | X | X | X | X | X | X |

Izod Impact Strength (kg.cm/cm): ASTM D-256, ⅛ inch, with notch, 23° C.
Falling Ball Strength (kg.m): test piece thickness 3 mm, measurement temperature −30° C., (falling height which destroyed half of the test pieces) × (weight of the ball).
Tensile Strength (kg/cm$^2$): ASTM D-638, 23° C.
Heat Distortion Temperature (°C.): ASTM D-648, loading 4,6 kg/cm$^2$.
Molding Property: Using a 5-ounce injection molding machine, pellets were molded into a box-like form weighing about 100 g, at a cylinder temperature of 280° C. and a mold temperature of 80° C. The thus-obtained molded box was examined with the naked eye for discoloration, flow marks, warpage, silver streaks, short shot, and surface evenness. The evaluation of the box was based on the following criterion.
O . . . substantially no defects were observed.
Δ . . . slight defects were observed.
X . . . considerable defects were observed.

EXAMPLE 12 AND COMPARATIVE EXAMPLE 8

I. Preparation of Thermoplastic Resin Compositions

Using the polyarylates, polyamide, acid anhydride-containing olefin copolymer, and epoxy-containing olefinic copolymer as described below, various thermoplastic resin compositions in the form of pellets were prepared by blending the ingredients in the respective proportions as shown in Table 3-1, and then extruding each of the blends at 270° C. with a double-screw extruder.

Polyarylate

Various polyarylates (polyarylates A-1 to A-5 and polyarylates B-1 to B-3) were prepared by subjecting mixtures each composed of terephthalic acid dichloride and isophthalic acid dichloride, the molar ratios of the former dichloride to the latter being specified in Table 2, and bisphenol A to polycondensation, with the molar ratio of each mixture to the bisphenol A being 1 to 1.

The acid values (10$^{-6}$ eq/g) in Table 2 were obtained as follows. About 0.1 to 0.2 g of a polyarylate sample was precisely weighed and dissolved in 18 ml of chloroform. To this chloroform solution was added 2 ml of benzyl alcohol. Using 0.1 wt% phenol red as an indicator, the chloroform solution was then titrated with 1/10 N sodium hydroxide solution in benzyl alcohol as a titrant. From the amount of the titrant added, the acid value was calculated using the equation given below.

In the above titration, the point where the color of the indicator changed from yellow to red was taken as the end point for the titration. A blank test was also performed for accuracy of the titration.

$$\text{Acid value} = \frac{(A - B) \times 0.1 \times F}{W}$$

wherein
A: amount of titrant added (μl (=10$^{-6}$ l)
B: amount of titrant added in blank test (μl)
F: titer of the 1/10 N sodium hydroxide solution in benzyl alcohol
W: Weight of sample (g)

Polyamide

Poly(ε-caprolactam) (trade name AMILAN CM 1026, manufactured by Toray Industries, Inc., Japan).

Modified Polyolefin

1. Modified Polyolefin C-1:

Maleic anhydride-graft-polymerized ethylene-propylene copolymer (trade name T7711 SP, manufactured by Japan Synthetic Rubber Co., Ltd., Japan).

2. Modified Polyolefin C-2:

Ethylene-glycidyl methacrylate copolymer (trade name BONDFAST E, manufactured by Sumitomo Chemical Co., Ltd., Japan).

TABLE 2

| | Aromatic dicarboxylic acids Components (mol %) | | Intrinsic viscosity | Acid value ($10^{-6}$ eq/g) |
|---|---|---|---|---|
| | Isophthalic acid | Terephthalic acid | | |
| A-1 | 100 | 0 | 0.56 | 80 |
| A-2 | 100 | 0 | 0.60 | 60 |
| A-3 | 80 | 20 | 0.58 | 90 |
| A-4 | 80 | 20 | 0.61 | 50 |
| A-5 | 80 | 20 | 0.53 | 35 |
| B-1 | 100 | 0 | 0.60 | 5 |
| B-2 | 100 | 0 | 0.58 | 17 |
| B-3 | 80 | 20 | 0.57 | 20 |

II. Measurement of Impact Strength and Evaluation of Surface Quality

The various thermoplastic resin compositions in the form of pellets prepared in (I) above were dried under vacuum at 120° C. for 15 hours, and then injection-molded into test pieces. The thus-prepared test pieces were evaluated by measuring their high-speed punching impact strength and high-speed punching impact strength at welded parts (i.e., marks developing at welded parts in injection-molded articles), and further by examining their surface quality (Examples 12—1 to 12—12 and Comparative Examples 8—1 to 8—7). Methods for the above evaluations are as follows.

Measuring Method for High-Speed Punching Impact Strength

Each of the test pieces described above was cut into a plate measuring 100 mm × 100 mm × 3 mm, which was then subjected to high-speed punching by the use of a high-speed punching impact strength tester (type HRIT 8000, manufactured by Rheometric Company) and the energy (joules) needed for punching the plate was measured. The punching of the plates was performed with a punch having a diameter of ⅝ inch at a punching speed of 5 m/sec, at ambient temperatures of both 23° C. and −30° C.

Measuring Method for High-Speed Punching Impact Strength at Welded Parts

Test pieces used were plates each measuring 100 mm × 100 mm × 3 mm (two gates) which had been obtained by molding pellets at an injection pressure 5 kg/cm² (gauge pressure) higher than the minimum pressure for full filling and which had welds developed at the center thereof. The high-speed punching impact strength of the plates was measured at a temperature of -30° C. in such a manner that the tip of the punch was brought into contact with the welded parts in the plates.

Evaluation Method for Surface Quality

Plates measuring 100 mm × 10 mm × 3 mm which had been cut out of the above-obtained test pieces were examined with the naked eye for surface defects such as flow marks and silver streaks. The evaluation of surface quality was based on the following criterion O . . . substantially no surface defects were observed.
Δ . . . slight surface defects were observed.
X . . . considerable surface defects were observed.

The results of the measurements and evaluation are shown in Table 3.

TABLE 3

| | Example | | | | | | | | | | | |
|---|---|---|---|---|---|---|---|---|---|---|---|---|
| | 18-1 | 18-2 | 18-3 | 18-4 | 18-5 | 18-6 | 18-7 | 18-8 | 18-9 | 18-10 | 18-11 | 18-12 |
| Polyarylate | | | | | | | | | | | | |
| A-1 (wt %) | 45 | — | — | — | — | — | — | — | — | — | — | — |
| A-2 (wt %) | — | 45 | — | — | — | — | — | 45 | — | 45 | — | — |
| A-3 (wt %) | — | — | 45 | — | — | — | — | — | — | — | — | — |
| A-4 (wt %) | — | — | — | 45 | — | 60 | 30 | — | 45 | — | 45 | — |
| A-5 (wt %) | — | — | — | — | 45 | — | — | — | — | — | — | 45 |
| B-1 (wt %) | — | — | — | — | — | — | — | — | — | — | — | — |
| B-2 (wt %) | — | — | — | — | — | — | — | — | — | — | — | — |
| B-3 (wt %) | — | — | — | — | — | — | — | — | — | — | — | — |
| Polyamide (wt %) | 45 | 45 | 45 | 45 | 45 | 30 | 60 | 45 | 45 | 45 | 45 | 45 |
| Modified polyolefin | | | | | | | | | | | | |
| C-1 (wt %) | 10 | 10 | 10 | 10 | 10 | 10 | 10 | — | — | 5 | 5 | 5 |
| C-2 (wt %) | — | — | — | — | — | — | — | 10 | 10 | 5 | 5 | 5 |
| High-speed punching impact strength (J) | | | | | | | | | | | | |
| 23° C. | 82 | 75 | 77 | 83 | 69 | 77 | 85 | 63 | 66 | 72 | 70 | 61 |
| −30° C. | 60 | 59 | 60 | 63 | 55 | 61 | 65 | 50 | 55 | 57 | 50 | 48 |
| High-speed punching impact strength at welded parts (J) −30° C. | 40 | 55 | 45 | 47 | 37 | 39 | 55 | 42 | 34 | 33 | 30 | 32 |
| Surface quality | O | O | O | O | O | O | O | O | O | O | O | O |

| | Comparative Example | | | | | | |
|---|---|---|---|---|---|---|---|
| | 13-1 | 13-2 | 13-3 | 18-4 | 13-5 | 13-6 | 13-7 |
| Polyarylate | | | | | | | |
| A-1 (wt %) | — | — | — | — | — | — | — |
| A-2 (wt %) | — | — | — | — | — | — | — |
| A-3 (wt %) | — | — | — | — | — | — | — |
| A-4 (wt %) | — | — | — | — | 50 | — | — |
| A-5 (wt %) | — | — | — | — | — | — | — |
| B-1 (wt %) | 45 | — | — | 45 | — | — | — |

TABLE 3-continued

|  |  |  |  |  |  |  |  |
|---|---|---|---|---|---|---|---|
| B-2 (wt %) | — | 45 | — | — | — | 45 | — |
| B-3 (wt %) | — | — | 45 | — | — | — | 45 |
| Polyamide (wt %) | 45 | 45 | 45 | 45 | 50 | 45 | 45 |
| Modified polyolefin |  |  |  |  |  |  |  |
| C-1 (wt %) | 10 | 10 | 10 | — | — | 5 | 5 |
| C-2 (wt %) | — | — | — | 10 | — | 5 | 5 |
| High-speed punching impact strength (J) |  |  |  |  |  |  |  |
| 23° C. | 13 | 25 | 35 | 18 | 10 | 50 | 53 |
| −30° C. | 7 | 9 | 13 | 8 | 4 | 23 | 25 |
| High-speed punching impact strength at welded parts (J) −30° C. | 1 | 1.5 | 2 | 3 | 2 | 4 | 5 |
| Surface quality | X | X | X | X | O | Δ | Δ |

Table 3 shows that the molded articles (Examples 18—1 to 18—12) obtained from thermoplastic resin compositions of this invention, which compositions had been obtained by compounding a polyarylate having an acid value in the range of from $30 \times 10^{-6}$ to $150 \times 10^{-6}$ eq/g, a polyamide and a modified polyolefin, are not only high in both high-speed punching impact strength and high-speed punching impact strength at welded parts thereof, but also excellent in surface quality.

In contrast thereto, the molded articles (Comparative Examples 8—1 to 8—4, 8—6 and 8—7) obtained from resin compositions prepared by compounding a polyarylate having an acid value lower than $30 \times 10^{-6}$ eq/g, a polyamide and a modified polyolefin, and the molded article (Comparative Example 8—5) obtained from a resin composition consisting of a polyarylate having an acid value in the range of from $30 \times 10^{-6}$ to $150 \times 10^{-6}$ eq/g and a polyamide and not containing a modified polyolefin are all poor in high-speed punching strength and high-speed punching strength at welded parts. Further, all these resin compositions, except the resin composition of Comparative Example 8—5, are poor in surface quality.

It is especially surprising that, as demonstrated above, the resin compositions consisting of a polyarylate having an acid value lower than $30 \times 10^{-6}$ eq/g, a polyamide and a modified polyolefin, and the resin composition consisting of a polyarylate having an acid value in the range of from $30 \times 10^{-6}$ to $150 \times 10^{-6}$ eq/g and a polyamide are all very low in high-speed punching impact strength as measured at a low temperature, whereas the thermoplastic resin compositions of this invention which employ the above-described specific combination of the ingredients exhibit excellent physical properties.

EXAMPLES 13-18 AND COMPARATIVE EXAMPLES 9-11

Resin Composition (A)

Polyarylate: A polymer produced from 2,2-bis(4-hydroxyphenyl)propane and a 3/7 mixture of terephthalic acid and isophthalic acid, and having an intrinsic viscosity of 0.6, and an acid value of $90 \times 10^{-6}$ eq/g.

Polyamide: Polycaprolactam (trade name AMILAN CM 1026, manufactured by Toray Industries, Inc., Japan). Acid Anhydride-Containing Olefin Copolymer [Polymer (B)]

B-1 and B-2 as specified below were used;

B-1: A polymer obtained by adding 0.8 part of maleic anhydride to 99.2 parts of an ethylene-propylene copolymer having an Mw of 280,000 and an ethylene content of 74%, subsequently adding thereto di-tertbutyl peroxide at normal temperature, mixing the ingredients, and then extruding the resulting mixture at 200° C. with a single-screw extruder, thereby allowing the maleic anhydride to react with the copolymer.

B-2: A polymer obtained by adding 0.1 part of maleic anhydride to 99.9 parts of an ethylene-propylene copolymer having an Mw of 150,000 and an ethylene content of 74%, subsequently adding thereto di-tertbutyl peroxide at normal temperature, mixing the ingredients, and then extruding the resulting mixture at 200° C. with a single-screw extruder, thereby allowing the maleic anhydride to react with the copolymer.

EPR: An ethylene-propylene copolymer having an Mw of 280,000 and an ethylene content of 74%.

BF: An ethylene-glycidyl methacrylate copolymer (trade name BONDFAST E, manufactured by Sumitomo Chemical, Co., Ltd., Japan).

Using the above-described polyarylate, polyamide [both for forming Resin Composition (A)], acid anhydride-containing olefin copolymers [Polymer (B)], EPR, and BF, various thermoplastic resin compositions were prepared by mixing the ingredients in the respective amounts as shown in Table 2, and then drying at 80° C. for 10 hours. Each of the dried compositions was pelletized at 270° C. with a double-screw extruder. The thus-obtained pellets were formed into pieces by injection molding, and the test pieces were evaluated for various properties. The results obtained are shown in Table 4.

Table 4 shows that the thermoplastic resin compositions of this invention are excellent not only in impact resistance, heat distortion resistance, and molding properties, but also in molding stability with a prolonged residence time in the extruder.

TABLE 4

|  | Example | | | | | | Comparative Example | |
|---|---|---|---|---|---|---|---|---|
|  | 13 | 14 | 15 | 16 | 17 | 18 | 9 | 10 |
| Resin Composition (A) |  |  |  |  |  |  |  |  |
| Polyarylate (parts) | 50 | 50 | 50 | 50 | 60 | 40 | 50 | 50 |
| Polyamide (parts) | 50 | 50 | 50 | 50 | 40 | 60 | 50 | 50 |
| Acid Anhydride-Containing |  |  |  |  |  |  |  |  |

TABLE 4-continued

|  | Example | | | | | | Comparative Example | |
|---|---|---|---|---|---|---|---|---|
|  | 13 | 14 | 15 | 16 | 17 | 18 | 9 | 10 |
| Olefin Copolymer [Polymer (B)] | | | | | | | | |
| B-1 (parts) | 10 | 20 | 30 | | | 20 | | |
| B-2 (parts) | | | | 20 | 15 | | | |
| EPR (parts) | | | | | | | | 20 |
| Izod impact strength | 45.1 | 71.5 | 86.4 | 65.3 | 50.1 | 73.1 | 6.5 | 11.0 |
| Falling ball strength | 4.6 | 7.1 | 7.8 | 6.4 | 5.2 | 7.1 | 0.7 | 1.2 |
| Tensile strength | 620 | 611 | 592 | 592 | 597 | 624 | 641 | 431 |
| Heat distortion temperature | 178 | 174 | 170 | 174 | 176 | 170 | 180 | 170 |
| Molding property-I | O | O | O | Δ | Δ | O | X | X |
| Molding property II | O | O | O | Δ | Δ | O | X | X |

EXAMPLE 19

To 664.3 g of bisphenol A, 27 g of p-t-butyl phenol, 5.28 g of sodium hydrosulfite, and 1.88 g of benzoltributylammonium chloride was added 1,536 ml of 5 N aqueous sodium hydroxide solution. The resulting mixture was stirred to dissolve the solid ingredients, and then the temperature of this solution was regulated at 30° C. On the other hand, 487.2 g of isophthalic acid chloride and 121.8 g of terephthalic acid chloride were dissolved in 5,000 ml of methylene chloride, and then the temperature of the resulting solution was regulated at 30° C.

Into a reaction vessel equipped with a stirrer and a jacket, the two solutions prepared above were simultaneously introduced, with vigorous stirring, over a period of 15 minutes by means of a constant-flow-rate pump, whereby a reaction was allowed to proceed. The reaction temperature was kept at 30° C. After completion of the introduction, the stirring was continued for another 60 minutes, subsequently 4.2 g of benzoyl chloride was added, and then the resulting reaction mixture was stirred for 20 minutes.

Thereafter, the stirring was stopped and the reaction mixture was allowed to stand, upon which the reaction mixture separated into an aqueous layer and a methylene chloride layer. The aqueous layer was removed, and 3,000 ml of water was added to the remaining methylene chloride layer and the resulting mixture was neutralized with hydrochloric acid with stirring. Then, the methylene chloride layer was washed with water three times, and 5,000 ml of acetone was added to the resulting methylene chloride layer to precipitate a polymer. The polymer precipitated was filtered off and then dried at 120° C. for 8 hours. The terminal carboxylic acid group content in the polyarylate thus obtained was determined by titration with sodium hydroxide solution in benzyl alcohol by use of phenol red as an indicator, and was found to be $90 \times 10^{-6}$ eq/g.

The above-obtained polyarylate and poly($\epsilon$-caprolactam) (trade name AMILAN CM 1026, manufactured by Toray Industries, Inc., Japan) were blended in various ratios as shown in Table 4 and extruded at 270° C. with a double-screw same-direction extruder. The thus-obtained blends were subjected to injection molding, and the dispersed state of the polyarylate was examined and physical properties were evaluated on the molded samples. The results obtained are shown in Table 5.

EXAMPLE 20

Polymerization was performed under the same polymerization conditions as in Example 19 except that the polymerization temperature was regulated at 10° C. The terminal carboxylic acid group content in the thus-obtained polyarylate was $55 \times 10^{-6}$ eq/g.

This polyarylate was blended with poly($\epsilon$-caprolactam) in the same manner as in Example 19, and the dispersed state of the polyarylate was examined and the physical properties of the blends were evaluated. The results obtained are shown in Table 5.

COMPARATIVE EXAMPLE 14

Polymerization was performed under the same polymerization conditions as in Example 19 except that the polymerization temperature was regulated at 10° C. and that the introduction of the bisphenol A solution in aqueous sodium hydroxide was initiated 30 seconds early.

The terminal carboxylic acid group content in the thus-obtained polyarylate was $13 \times 10^{-6}$ eq/g.

This polyarylate was blended with poly($\epsilon$-caprolactam) in the same manner as in Example 19, and the dispersed state of the polyarylate was examined and the physical properties of the blends were evaluated. The results obtained are shown in Table 5.

TABLE 5

|  | Polyarylate/ poly ($\epsilon$-caprolactam) ratio (by weight) | Average particle diameter of dispersed polyarylate (μm) | Dispersed state of polyarylate | Surface quality of molded article | Physical property | | Surface appearance after 24-hr immersion in methylene chloride |
|---|---|---|---|---|---|---|---|
|  |  |  |  |  | Elongation at break (%) | Izod impact strength (23° C.) (kg.cm/cm) |  |
| Example 19 | 60/40 | 0.5 | uniform | good | 35 | 11 | no change |
|  | 50/50 | 0.4 | " | " | 50 | 13 | " |
|  | 40/60 | 0.45 | " | " | 70 | 14 | " |
| Example 20 | 60/40 | 0.55 | uniform | good | 30 | 10 | no change |
|  | 50/50 | 0.50 | " | " | 45 | 11 | " |
|  | 40/60 | 0.40 | " | " | 60 | 13 | " |
| Comparative Example 14 | 60/40 | 2.0 | ununiform | poor | 2 | 3 | blushed |
|  | 50/50 | 1.8 | " | " | 4 | 3 | " |

While the invention has been described in detail and with reference to specific embodiments thereof, it will be apparent to one skilled in the art that various changes and modifications can be made therein without departing from the spirit and scope thereof.

What is claimed is:

1. A thermoplastic resin composition which comprises 100 parts by weight of a resin composition (A-1) consisting of 20 to 80% by weight of a polyarylate having an acid value of $30 \times 10^{-6}$ eq/g and 80 to 20% by weight of a polyamide; and 1 to 40 parts by weight of graft copolymer (B), comprising 70 to 5% by weight of at least one monomer selected from the group consisting of vinyl compounds, unsaturated glycidyl compounds, $\alpha,\beta$-unsaturated dicarboxylic anhydrides, and $\alpha,\beta$-unsaturated carboxylic acids copolymerized in the presence of 30 to 95% by weight of a rubber-like elastomer which has a glass transition temperature of up to 0° C. and which is selected from the group consisting of diene based rubbers, acrylic rubbers and olefin based rubbers.

2. A thermoplastic resin composition as claimed in claim 1, wherein said at least one monomer which is graft-copolymerized in the presence of the rubber-like elastomer consists of 50 to 100% by weight of a vinyl compound, 0 to 50% by weight of an unsaturated glycidyl compound, 0 to 50% by weight of an $\alpha,\beta$-unsaturated dicarboxylic anhydride, and 0 to 50% by weight of an $\alpha,\beta$-unsaturated carboxylic acid.

3. A thermoplastic resin composition as claimed in claim 1, wherein the polyarylate is an aromatic polyester which is prepared by reacting a bisphenol A and terephthalic acid and/or isophthalate.

4. A thermoplastic resin composition as claimed in claim 1, wherein the polyarylate has an intrinsic viscosity when measured in the form of chloroform solution at 30° C., of 0.2 to 1.5.

5. A thermoplastic resin composition as claimed in claim 1, wherein the polyamide is a Nylon-6.

6. A thermoplastic resin composition as claimed in claim 1, wherein the polyamide is a Nylon-6,6.

7. A thermoplastic resin composition which comprises 100 parts by weight of a resin composition (A-2) consisting of 20 to 80% by weight of a polyacrylate having an acid value of $30 \times 10^{-6}$ to $150 \times 10^{-6}$ eq/g and 80 to 20% by weight of a polyamide; and 1 to 40 parts by weight of a graft copolymer (B) or a modified polyolefin prepared from an $\alpha$-olefin having 2 to 30 carbon atoms and modified by introducing therein a monomer having at least one functional group selected from the group consisting of a carboxylic acid group, a carboxylic acid metal salt group, a carboxylate group and acid anhydride group, an epoxy group, an acid amido group and an imido group (C), said graft copolymer (B) being obtained by copolymerizing 70 to 5% by weight of at least one monomer selected from the group consisting of vinyl compounds, unsaturated glycidyl compounds, $\alpha,\beta$-unsaturated carboxylic acids in the presence of 30 to 95% by weight of a rubber-like elastomer.

8. A thermoplastic resin composition as claimed in claim 7, wherein said at least one monomer which is graft-copolymerized in the presence of the rubber-like elastomer consists of 50 to 100% by weight of a vinyl compound, 0 to 50% by weight of an unsaturated glycidyl compound, 0 to 50% by weight of an $\alpha,\beta$-unsaturated dicarboxylic anhydride, and 0 to 50% by weight of an $\alpha,\beta$-unsaturated carboxylic acid.

9. A thermoplastic resin composition as claimed in claim 7, wherein the modified polyolefin (C) is an acid anhydride-containing olefin copolymer.

10. A thermoplastic resin composition as claimed in claim 7, wherein the modified polyolefin (C) is an epoxy group-containing olefin copolymer.

11. A thermoplastic resin composition as claimed in claim 7, wherein the modified polyolefin (C) is obtained by graft-polymerizing an ethylene-propylene copolymer having a weight average molecular weight of 150,000 to 1,000,000 with 0.3 to 5 wt% maleic anhydride.

12. A thermoplastic resin composition as claimed in claim 7, wherein said modified polyolefin is a mixture of an acid anhydride-containing olefin copolymer and an epoxy group-containing olefin copolymer, the proportion of the former copolymer to the latter copolymer being from 1/9 to 9/1 by weight.

13. A thermoplastic resin composition as claimed in claim 7, wherein the polyarylate is an aromatic polyester which is prepared by reacting a bisphenol A and terephthalic acid and/or isophthalate.

14. A thermoplastic resin composition as claimed in claim 7, wherein the polyarylate has an intrinsic viscosity, when measured in the form of chloroform solution, at 30° C., of 0.2 to 1.5.

15. A thermoplastic resin composition as claimed in claim 7, wherein the polyamide is a Nylon-6.

16. A thermoplastic resin composition as claimed in claim 7, wherein the polyamide is a Nylon-6,6.

17. A thermoplastic resin composition which comprises 20 to 80% by weight of a polyarylate having an acid value of $30 \times 10^{-6}$ to $150 \times 10^{-6}$ eq/g and 80 to 20% by weight of a polyamide.

18. A thermoplastic resin composition as claimed in claim 17, wherein the polyarylate has an intrinsic viscosity, when measured in the form of chloroform solution, at 30° of C.0.2 to 1.5.

19. A thermoplastic resin composition as claimed in claim 17, wherein the polyamide is a Nylon-6.

20. A thermoplastic resin composition as claimed in claim 17, wherein the polyamide is a Nylon-6,6.

21. A thermoplastic resin composition as claimed in claim 4, wherein the polyarylate has an intrinsic viscosity, when measured in the form of chloroform solution, at 30° C., of 0.4 to 0.8.

22. A thermoplastic resin composition as claimed in claim 14, wherein the polyarylate has an intrinsic viscosity, when measured in the form of chloroform solution at 30° C., of 0.4 to 0.8.

23. A thermoplastic resin composition as claimed in claim 18, wherein the polyarylate has an intrinsic viscosity, when measured in the form of chloroform solution at 30° C., of 0.4 to 0.8.

* * * * *

UNITED STATES PATENT AND TRADEMARK OFFICE
CERTIFICATE OF CORRECTION

PATENT NO. : 5,017,651
DATED : May 21, 1991
INVENTOR(S) : Tomita et al It is certified that error appears in the above-identified patent and that said Letters Patent is hereby corrected as shown below:

Column 19, claim 1, line 4, "$30 \times 10^{-6}$ eq/g" should read -- from $30 \times 10^{-6}$ to $150 \times 10^{-6}$ eq/g--.

Signed and Sealed this

Eleventh Day of May, 1993

*Attest:*

MICHAEL K. KIRK

*Attesting Officer*  *Acting Commissioner of Patents and Trademarks*